Nov. 12, 1940.  G. G. MORIN  2,221,218
NEGATIVE HOLDER FOR PHOTOGRAPHIC ENLARGERS
Filed Sept. 10, 1938   2 Sheets-Sheet 2
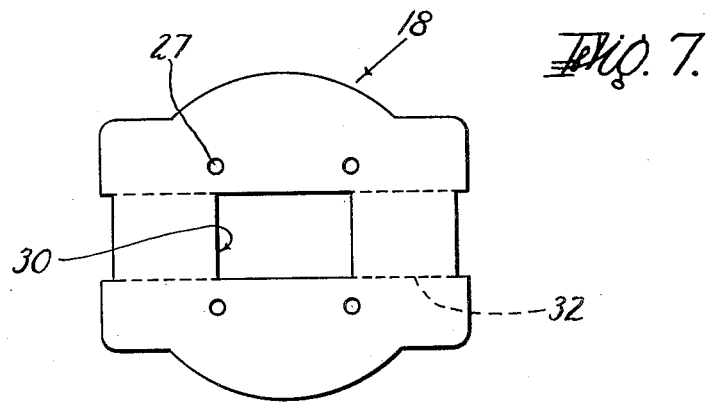
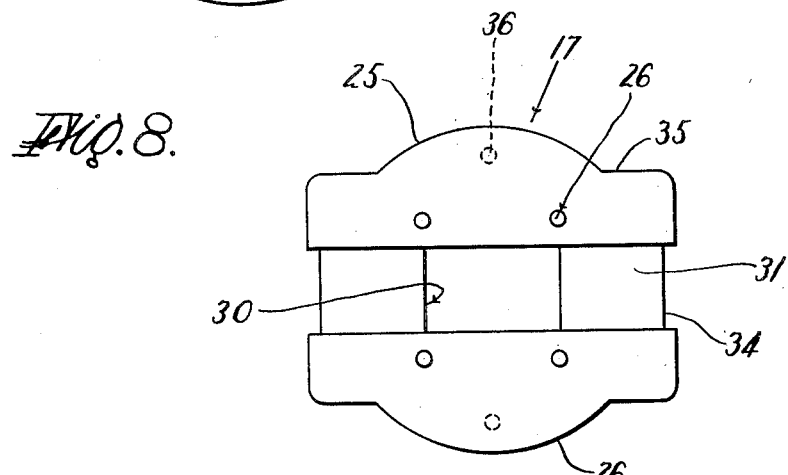
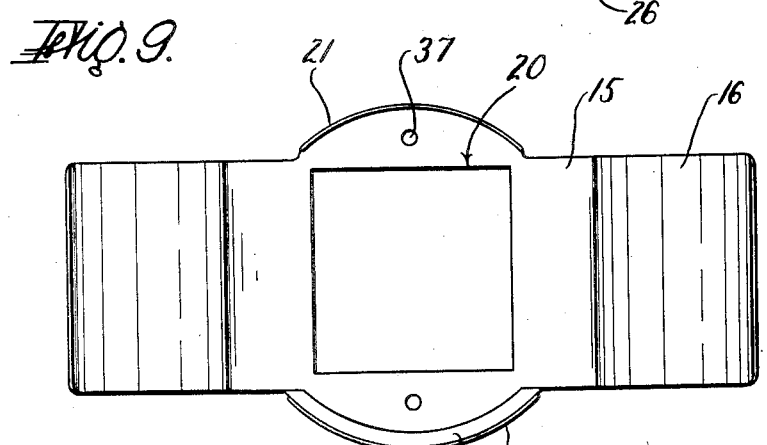
INVENTOR
GEORGE G. MORIN
BY Chapin + Neal
ATTORNEYS Patented Nov. 12, 1940

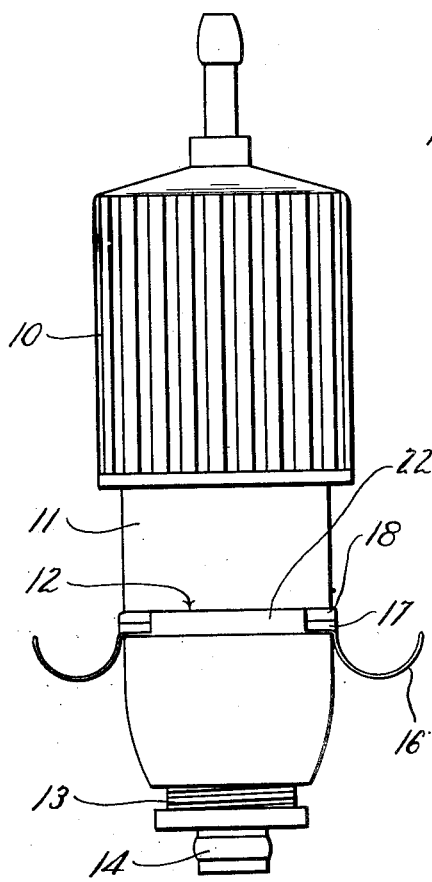
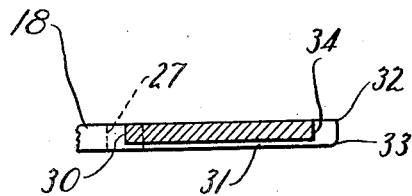
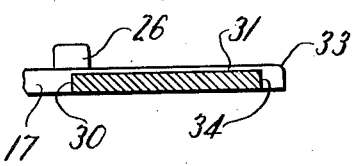
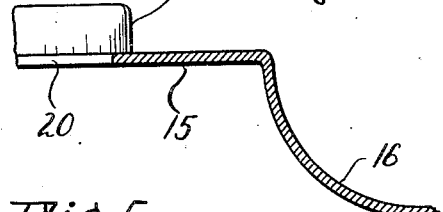
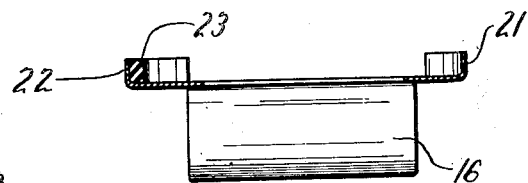
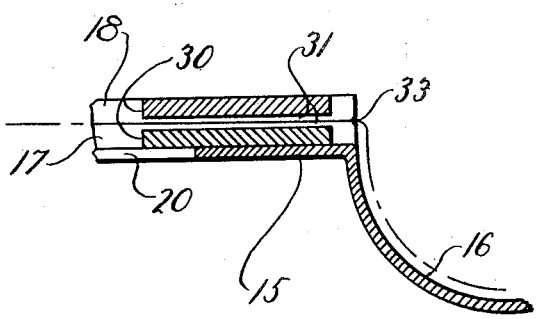

2,221,218

UNITED STATES PATENT OFFICE 2,221,218

NEGATIVE HOLDER FOR PHOTOGRAPHIC ENLARGERS

George G. Morin, Holyoke, Mass.

Application September 10, 1938, Serial No. 229,359

6 Claims. (Cl. 88—24)

This invention relates to negative holders particularly adapted for photographic enlargers. One object of the invention is to provide a negative holder for the purpose stated in which the film will be firmly and smoothly held without the use of a glass film support. A further object is to provide a holder in which the film will be held flat and firm without the use of springs or spring-held clips. A further object is to provide a negative holder in which the image bearing section of the emulsion will never contact with any part of the holder even though the film is drawn through the holder or shifted in position therein. A further object is to provide a holder which will hold the film tightly against shifting both while the negative holder is being handled outside the enlarger, while it is being placed therein, and while the enlarger itself is shifted from a vertical to a horizontal position or vice versa. A further object is to provide a negative holder which also serves as a mask to restrict the transmitted light to the picture-bearing part of the film. Additional objects, as well as the manner in which the objects specified are accomplished, will appear from the following description and claims.

Referring to the drawings,

Fig. 1 is a diagrammatic view of the head of an enlarging apparatus showing the improved negative holder in place;

Fig. 2 is a detailed section of one end of one of the negative holding elements;

Fig. 3 is a similar view of the cooperating negative holding element;

Fig. 4 is a similar view of the negative holder frame;

Fig. 5 is a transverse median section through the negative holder frame;

Fig. 6 is a section through the parts shown in Figs. 2, 3, and 4, but with the parts assembled and the negative in place; and Figs. 7, 8, and 9 are top plan views respectively of the parts shown in Figs. 2, 3, and 4.

The enlarging apparatus in which the improved negative holder is used may be of any desired type. As shown it includes a light housing 10, a condenser housing 11 having a transverse slot 12 extending a sufficient distance through it to receive the negative holder to be described, a focusing tube 13, and an enlarging lens 14. These parts may be of any standard or desired construction and it is not necessary to consider their functioning in detail.

The negative holder is composed of three parts: a frame 15 preferably of stamped metal and having the usual bowed ends forming carriers 16 to receive the rolled-up portions of strip film; a bottom holder 17; and a top holder 18. The negative holder frame 15 has a central aperture 20 sufficiently large to accommodate the largest film for which the apparatus is designed. It also has an upstanding flange 21 of arcuate form on one side and a somewhat similar upstanding arcuate flange 22 on the other side. This latter flange is shown as being further from the longitudinal axis of the frame so as to receive an arcuate strip of rubber 23 for a purpose to be described.

The lower film holding element 17 is shown as having arcuate sides 25 and 26 shaped to fit against the flange 21 and the rubber strip 23, respectively. The fit is preferably fairly close so that when the lower element 17 is inserted in place the rubber strip will be slightly compressed and the holding element thereby firmly held in position. The upper holding element 18 is generally similar in shape and besides being held in position by the flange and rubber strip previously described, is preferably held to the lower member 17 by dowel pins 26 on the latter, passing through holes 27 on the member 18. By this means the two members can be assembled before being placed in the holder and may then be inserted in the latter with no danger of destroying their relative position. The lower holding element 17 may be made integral with the frame 15 if desired, but the separate construction described is preferable as it permits the alternate use of holding elements of different sizes in one frame.

The film guiding portions of the elements 17 and 18 deserve special mention. Each of these members is perforated with a central aperture 30 of a size corresponding to that of the picture area of the film to be used. The pins 26 are located sufficiently close to the central aperture so that they serve as guides for the side edge portions of the film. Each film supporting element is longitudinally cut away, as shown at 31 in Fig. 8, and as indicated in dotted lines at 32 in Fig. 7, so as to leave a shallow trough extending from the central aperture along the picture bearing portion of the film. It will be seen clearly from Fig. 6 that the film is supported firmly by its edges between the body portions of the two members 17 and 18 while the relieved portions 31 of the two members prevent contact with the picture bearing area of the film at any point throughout the length of the negative holder. The portions of the holding members which contact the edges of the negative are preferably left with a metallic finish, but may, if desired, be covered with some soft material such as chamois. The ends of the members 17 and 18 are preferably rounded as at 33, and the members are formed with end cuts 34 to prevent contact of the film holder with the picture-bearing portion of the negative, even when the negative extends beyond the holder into the carriers 16 as when strip film is being used.

It is preferable that the elements 17 and 18 be held in a predetermined position with respect to the negative holder frame 15. For this purpose contact of the flattened-off portions 35 with the ends of the flanges 21 and 22 may be sufficient, or dowels 37 may be fitted into holes 36 formed in the bottom holder, if desired. It is also preferable that the assembled three-part film holder be held in the condenser housing 11 sufficiently tightly so that if the enlarger is shifted, say to a horizontal position after the negative holder has been installed, there will be no danger of displacement. This purpose is served admirably by the rubber strip 23 which is chosen of sufficient thickness so that it will be compressed slightly on being pushed into the slot 12.

One additional feature of the invention should be noted. The upper negative-holding member 18 is of sufficient weight so that it will hold the film positively without the use of springs or clips; which are objectionable, not only because of the difficulty of moving them into position, but because their localized point of contact with the film necessitates a sufficient pressure as to produce serious jerkiness when the film is moved, and also a tendency to scratch. In the present case the holding of the film is entirely by the weight of the members and is distributed throughout the entire portion of their area which is in contact, the picture bearing area being, as stated before, entirely out of surface contact with the holder so as to avoid scratching. The negative holder may also be combined with the usual masks of paper or the like, preferably inserted between the holding members in contact with the negative.

I claim:

1. A negative holder for photographic enlargers and the like comprising opposed plate-like members apertured to permit passage of light through the desired portion of the negative and grasping the negative between them adjacent said aperture, said members being relieved in a direction longitudinally of the film to prevent contact between them and the picture-bearing portion of the film, and being cut away at their ends to prevent contact therewith of the extending portion of film when bent out of the plane of said members.

2. A negative holder for photographic enlargers and the like comprising opposed plate-like members apertured to permit passage of light through the desired portion of the negative and relieved longitudinally of said apertured portion to prevent contact of the picture-bearing portion of a film therewith, and dowels holding the members together and positioned to contact and guide the lateral edges of a film, the members grasping the film only in the area between the line of said dowels and the edges of said apertured and relieved portions.

3. A negative holder for photographic enlargers and the like comprising opposed plate-like members apertured to permit passage of light through the desired portion of the negative and relieved longitudinally of said apertured portion to prevent contact of the picture-bearing portion of a film therewith, said members being cut away at their ends to prevent contact therewith of an extending portion of film bent out of the plane of said members, and dowels holding the members together and positioned to contact and guide the lateral edges of a film, the members grasping the film only in the area between the line of said dowels and the edges of said apertured and relieved portions.

4. A negative holder for photographic enlargers and the like comprising a centrally apertured frame having lateral upstanding opposed flanges, a pair of centrally apertured plate-like members formed to grasp a film between them and a yieldable member retained by one of said flanges and engaging the edge of said plate-like members to hold them in the frame.

5. A negative holder for photographic enlargers and the like comprising a centrally apertured frame having lateral upstanding opposed flanges, a pair of centrally apertured plate-like members formed to grasp a film between them and a yieldable member retained by one of said flanges and engaging said plate-like members, and means to prevent rotative movement of said plate-like members upon the frame.

6. A negative holder for photographic enlargers and the like comprising a centrally apertured frame having lateral upstanding opposed flanges, a pair of centrally apertured plate-like members formed to grasp a film between them, guide pins secured to one of the members and passing freely into the other to hold said members in registry and to guide the edge portions of the film, and a member carried by the frame and engaging said plate-like members to hold them as a unit.

GEORGE G. MORIN.